United States Patent
Lakeman et al.

(10) Patent No.: US 7,192,998 B2
(45) Date of Patent: Mar. 20, 2007

(54) ADDITIVE FOR RENDERING INERT ACIDIC OR HALOGEN-CONTAINING COMPOUNDS CONTAINED IN OLEFIN POLYMERS

(75) Inventors: Pascal E. R. E. J. Lakeman, Bergen op Zoom (NL); Johan A. Thoen, HB Terneuzen (NL)

(73) Assignee: Dow Global Technologies Inc., Midland, MI (US)

( * ) Notice: Subject to any disclaimer, the term of this patent is extended or adjusted under 35 U.S.C. 154(b) by 357 days.

(21) Appl. No.: 10/494,981

(22) PCT Filed: Dec. 13, 2002

(86) PCT No.: PCT/US02/40141

§ 371 (c)(1),
(2), (4) Date: May 7, 2004

(87) PCT Pub. No.: WO03/055920

PCT Pub. Date: Jul. 10, 2003

(65) Prior Publication Data

US 2004/0242734 A1 Dec. 2, 2004

(51) Int. Cl.
*C07F 7/18* (2006.01)
*C08K 5/15* (2006.01)

(52) U.S. Cl. .................. 524/82; 524/110; 524/111; 524/113; 524/583; 526/348.2

(58) Field of Classification Search ............. 524/174, 524/177, 381, 583, 82, 110, 111, 113; 526/348.2
See application file for complete search history.

(56) References Cited

U.S. PATENT DOCUMENTS 3,219,622 A * 11/1965 Luciano et al. ............. 524/381

FOREIGN PATENT DOCUMENTS

| EP | A067 645 | 12/1982 |
|----|----------|---------|
| EP | A071 252 A1 | 2/1983 |
| GB | 2132214 | 7/1984 |
| WO | WO 92/14766 | 9/1992 |

* cited by examiner

*Primary Examiner*—Peter D. Mulcahy

(57) ABSTRACT

A process for producing olefin polymers, which comprises the steps of polymerizing an olefin monomer in a polymerization zone in the presence of a catalyst comprising a transition metal compound to form an olefin polymer, and adding at the end of or downstream from the polymerization zone a composition having a weight averaged molecular weight of at least 100 and containing a group R, a cation Y, an anionic group —$C(R^1)_2$—$X^-$, and optionally a group —$C(R^1)_2$—$X$—H, the composition having a relative the composition having a relative mole fraction n of cations Y and a relative mole fraction m of group —$C(R^1)_2$—$X$—H, wherein $0<n\leq1$, $0\leq-m<1$, and $n+m=1$. Use of such $m=1$. Use of such a composition for rendering inert undesired quantities of acidic compounds or halogen-containing compounds present in an olefin polymer by mixing the olefin polymer intimately with the additive composition.

11 Claims, No Drawings

ADDITIVE FOR RENDERING INERT ACIDIC OR HALOGEN-CONTAINING COMPOUNDS CONTAINED IN OLEFIN POLYMERS

This invention relates to a process for producing olefin polymers comprising adding an additive composition at the end of the polymerization zone or downstream therefrom, as well as using the additive composition for rendering inert undesired quantities of acidic compounds or halogen-containing compounds present in an olefin polymer.

BACKGROUND OF THE INVENTION

Olefin polymers such as polyethylenes and polypropylenes are produced by use of a transition metal polymerization catalyst thereby leaving small amounts of catalyst residues in the polymer. Such residues are typically deactivated after the polymer leaves the polymerization zone, because otherwise undesired polymerization reactions and other undesired reactions may occur outside the polymerization zone, especially when the polymerization mixture is subjected to higher temperatures. Higher temperatures especially occur in solution or high pressure polymerization processes where the temperatures of the polymerization mixture leaving the reactor may be well above 100° C. Undesired polymerization causes formation of low molecular weight oligomers, waxes and greases or otherwise changes polymer properties in an uncontrollable manner. In addition, polymerization outside the reactor can lead to excess heat generation and deposits of relatively low molecular weight polymer especially in recycle lines and vessels. Polymers are also subjected to high temperatures when melt processing the polymers, such as in pellet extrusion or other extrusion or molding operations to make articles.

It is known to add water and other polar compounds or reactive hydrogen containing compounds at the end of a polymerization reaction to deactivate the polymerization catalyst. Upon contact of such compounds with the catalyst, considerable amounts of acidic compounds and halide containing compounds such as hydrogen chloride may be formed which cause corrosion in the process equipment and can enter into monomer or diluent recycle lines and thus need to be rendered inactive. Therefore, besides a deactivator compound also a compound is added that converts or traps the acidic and halogen-containing compounds into non-harmful compounds which can remain in the polymers. Compounds of a basic nature, and particularly metal salts of aliphatic or fatty acids such as calcium stearate and natural or synthetic hydrotalcites are typically used for this purpose. EP-67,645 and EP-71,252 disclose the use of water in combination with a fatty acid salt in a hydrocarbon, wherein the fatty acid salt may act to neutralize acids formed by the water-catalyst reaction.

The use of an aliphatic acid metal salt in the process may result in build-up of reaction products, such as aliphatic acids, e.g. fatty acids, in the recycled monomers and process diluent thereby leading to reduced polymerization rates and additional cost in cleaning up recycle lines. In addition, during processing at high temperature the corresponding aliphatic acid may migrate through the polymer and sweat out of the polymer onto processing equipment resulting in reduced processing and product performance, and requiring cleaning of equipment. Further, the aliphatic metal salts are not readily miscible with or dissolvable in polymer process streams under process conditions and as such are not very effective and need to be added in relatively large amounts, which also increases the production cost.

GB-2132214 discloses a process for polymerizing one or more 1-olefins at a pressure of at least 500 bar and at a temperature in the range of 150–320° C. wherein the polymerization catalyst is deactivated by adding a deactivating agent comprising a polyalkylene glycol, a polyvinyl alcohol or an aliphatic alcohol containing at least 10 carbon atoms.

EP-140131 discloses deactivation of catalyst systems comprising a transition metal compound and an organic aluminum compound in ethylene polymerization processes at pressures of 300 to 3500 bar and temperatures from 150 to 350° C. using polyglycols.

WO-92/14766 discloses the use of a combination of a non-volatile and a volatile catalyst killer in high pressure processes. Water or water-releasing compounds are disclosed as volatile catalyst killer. The non-volatile killer components may be a component with a molecular weight higher than 200, such as alcohols, phenols diols, polyols, saccharides, ethers, epoxides, aldehydes, ketones, carboxylic acids, diacids and polyacids, their anhydrides, esters or salts, polyalkylene glycols, and amines.

It is an objective of the present invention to provide for an additive composition that can render a transition metal polymerization catalyst or its decomposition products inert after the polymerization step or during conversion or use of the polymer, thereby avoiding significant corrosion problems in the process or conversion equipment. According to a further objective the present invention provides for the use of an additive composition that renders transition metal catalysts or its decomposition products inert without releasing unacceptable amounts of acidic byproducts.

It is another objective of the present invention to provide for an additive which can remain in the polymer and of which the reaction products can remain in the polymer without negatively influencing the product properties.

It is a further objective to provide a process in which problems of post reactor polymerization are reduced or eliminated.

According to yet another objective an additive composition is provided that reduces or eliminates the plating out of compounds from the polymer on processing equipment during high temperature conversion of the polymer.

SUMMARY OF THE INVENTION

The present invention provides a process for producing olefin polymers, which comprises the steps of:

polymerizing an olefin monomer in a polymerization zone in the presence of a catalyst comprising a transition metal compound to form an olefin polymer, adding at the end of or downstream from the polymerization zone a composition having a weight averaged molecular weight of at least 100 and containing a group R, a cation Y, an anionic group —$C(R^1)_2$—$X^-$ bonded to group R, and optionally a group —$C(R^1)_2$—X—H bonded to group R, wherein R comprises a moiety containing at least one carbon atom and at least one heteroatom selected from group 16 of the Periodic Table of Elements, each $R^1$ independently is hydrogen or a hydrocarbyl group of from 1 to 20 carbon atoms, X comprises an element selected from group 16 of the Periodic Table of Elements, Y is selected from the group consisting of a cation of a metal selected from groups 1 and 2 of the Periodic Table of Elements and a cation of the formula $[R^a{}_4M]^+$ wherein M is an element of group 15 of the Periodic Table of Elements and $R^a$ independently each occurrence is hydrogen or a hydrocarbyl group, C is carbon, H is hydrogen, the composition having a relative mole fraction n of cations Y and a relative mole fraction m of group —C(R$^1$)$_2$—X—H, wherein 0<n≦1, 0≦m<1, and n+m=1.

In a further aspect the present invention relates to the use of an additive composition having a weight averaged molecular weight of at least 100 and containing a group R, a cation Y, an anionic group —C(R$^1$)$_2$—X$^-$ bonded to group R, and optionally a group —C(R$^1$)$_2$—X—H bonded to group R, wherein R comprises a moiety containing at least one carbon atom and at least one heteroatom selected from group 16 of the Periodic Table of Elements, each R$^1$ independently is hydrogen or a hydrocarbyl group of from 1 to 20 carbon atoms, X comprises an element selected from group 16 of the Periodic Table of Elements, Y is selected from the group consisting of a cation of a metal selected from groups 1 and 2 of the Periodic Table of Elements and a cation of the formula [R$^a$$_4$M]$^+$ wherein M is an element of group 15 of the Periodic Table of Elements and R$^a$ independently each occurrence is hydrogen or a hydrocarbyl group, C is carbon, H is hydrogen, the composition having a relative mole fraction n of cations Y and a relative mole fraction m of group —C(R$^1$)$_2$—X—H, wherein 0<n≦1, 0≦m<1, and n+m=1, for rendering inert undesired quantities of acidic compounds or halogen-containing compounds present in an olefin polymer by mixing the olefin polymer intimately with the additive composition.

According to another aspect the invention relates to an article obtained by intimately mixing a molten olefin polymer with the additive composition and melt processing into an article.

DETAILED DESCRIPTION OF THE INVENTION

Additive Composition

The composition as used according to the present invention may be a single chemical compound or may be a mixture of different chemical compounds. The composition is also referred to herein as additive composition.

If the additive composition is a single compound, such compound contains per molecule at least one cation Y and associated therewith at least one anionic group —C(R$^1$)$_2$—X$^-$ and optionally one or more groups —C(R$^1$)$_2$—X—H. If the composition is a mixture of compounds the composition may contain compounds having only cation Y and an anionic group —C(R$^1$)$_2$—X$^-$, compounds having only —C(R$^1$)$_2$—X—H groups, and compounds containing both one or more cations Y and anionic groups —C(R$^1$)$_2$—X$^-$ and one or more —C(R$^1$)$_2$—X—H groups. The relative mole fraction n of cation Y and the relative mole fraction m of group —C(R$^1$)$_2$—X—H characterize the compositions in this regard. For example: if the composition is a single chemical compound of the formula H—X—C(R$^1$)$_2$—R—C(R$^1$)$_2$—X$^-$Y, the fraction n is 0.5 and fraction m is 0.5, if Y is a monovalent cation; and n is 0.33 and m is 0.67 if Y is a divalent cation providing a compound of formula [H—X—C(R$^1$)$_2$—R—C(R$^1$)$_2$—X$^-$]$_2$Y. If the composition is a single chemical compound of the formula R—C(R$^1$)$_2$—X$^-$Y, the fraction n is 1 and fraction m is 0. If the composition is a mixture of 50 mole percent of R—C(R$^1$)$_2$—X$^-$Y and 50 mole percent of R—C(R$^1$)$_2$—X—H, fractions n and m are both 0.5, if Y is a monovalent cation. In case group R comprises other groups (—C(R$^1$)$_2$—X—Q) which do not meet the definition of groups Y or —C(R$^1$)$_2$—X—H, such other groups are not included in the determination of mole fractions n and m.

If the additive composition is a mixture of compounds, the additive composition may comprise compounds of different molecular weights, depending on the preparation and purification process.

Group R generally is an organic moiety comprising carbon and hydrogen atoms and in addition a heteroatom from group 16 of the Periodic Table of Elements, such as oxygen, sulfur, selenium, preferably oxygen and sulfur, and most preferably oxygen. The heteroatom is preferably included in group R as a divalent group —X— bonded to carbon atoms at each side, thus an ether or thioether. Although ether and thioether based groups R are preferably contained in the present additive composition, also other heteroatom containing groups or repeating units may be advantageously contained in R, provided that that the composition contains a cation Y and anionic group —C(R$^1$)$_2$—X$^-$, and optionally —C(R$^1$)$_2$—X—H.

Group R preferably comprises one or more units of the general formula (—(CHR$^1$)$_t$—X—) wherein R$^1$ each occurrence independently represents hydrogen or an alkyl group having from 1 to 20 carbon atoms, X comprises an element selected from group 16 of the periodic table of elements, t is an integer from 1 to 10, which units may be the same or different. Such units are typically derived from polymerizing compounds like cyclic ethers or cyclic thioethers having from 2 to 10 carbon atoms in the ring, such as tetrahydrofuran, and alkylene oxides, such as ethylene oxide, substituted ethylene oxides, such as propylene oxide and butylene oxide, or by condensation of glycols, such as ethylene glycol or substituted ethylene glycols. Advantageously, in the units t is 2 and R$^1$ in at least one occurrence is hydrogen and in the other occurrence is hydrogen, methyl or ethyl, and X is oxygen. The ethers and oxide compounds can be polymerized via ring-opening reactions. Where X is group 16 element other than oxygen, analogous other group 16 element compounds, advantageously sulfur compounds, can be used to generate such units.

According to the present invention, the additive composition preferably comprises groups derived from the polymerization of alkylene sulfides or oxides, such as ethylene oxide (EO), propylene oxide (PO), and butylene oxide (BO) or mixtures of such oxides, and analogous sulfur compounds. If more than one alkylene oxide is used in the preparation of the additive composition, such alkylene oxides may be reacted simultaneously or sequentially, resulting in randomly distributed or sequentially distributed alkylene oxy groups. By sequential reaction of different alkylene oxides, blocks of the different units will be present. When such a different alkylene oxide is added at the end of the reaction of another alkylene oxide, a so-called capped poly(alkylene oxy) compound is obtained. By selecting the type of these monomers, the manner of reaction or incorporation and quantity thereof, the properties of the additive composition can be adjusted to the intended use. A higher ethylene-oxy content generally increases the hydrophilic character, whereas a higher propylene oxy or butylene oxy content increases the hydrophobic character of the additive composition. It has been found that additive compositions of a poly (propylene oxy) or poly (butylene oxy) capped with one or more ethylene oxy units have good solubility characteristics in hydrocarbon solvents, such as those used in polymerization processes, and at the same time have a suitable reactivity with catalysts and decomposition products thereof.

Group R advantageously comprises a group A derived from an initiator compound which group A is covalently bonded to one or more ether or thioether groups of general formula (—$(CHR^1)_t$—X—).

The initiator compound generally is a compound containing a reactive proton that may be used for reacting with a polymerizable group 16 element containing compound (also referred to as monomer) to form a group containing the derivative A of the initiator compound covalently bonded to one or more molecules of the polymerizable group 16 element containing compound. For preferred additive compositions, initiator compounds that have one or more reactive protons which are capable of reacting, either alone or in the presence of a catalyst, with an alkylene oxide or alkylene sulfide or other cyclic ethers or cyclic thioethers, to provide a further reactive alkyl oxide or alkyl sulfide group, are desirable. Preferably, the initiator compound is water, ammonia, or a hydrocarbyl compound comprising one or more substituents selected from the group consisting of OH, SH, COOH, COSH, CSSH, $NHR^e$ wherein $R^e$ is hydrogen or a hydrocarbyl group of up to 50 carbon atoms, or reactive derivatives of any of the foregoing groups, such as ethers, anhydrides, esters, and salts. The initiator compound and $R^e$ may contain saturated or unsaturated, linear or branched hydrocarbyl groups. Preferably, the initiator compound comprises one or more, substituted or unsubstituted, aliphatic, cycloaliphatic, and aromatic groups or mixtures thereof. As initiator compounds also prepolymers can be used wherein an initiator compound has already reacted with an oxide, sulfide or cyclic ether or thioether monomer to a certain degree. The additive composition or group R of the additive composition thus preferably comprises a derivative A of such an initiator compound.

The number of cations Y, anionic groups —$C(R^1)_2$—$X^-$, and optionally —$C(R^1)_2$—X—H groups per compound in the additive composition will depend on the functionality of group R and in particular on the functionality of the initiator molecule, if any, i.e. the number of reactive protons present in the initiator compound, and of the other reactants used in making the additive compositions. Preferably an initiator compound having a functionality f, i.e. a number of reactive groups, in the range from 1 to 10, most preferably in the range from 1 to 6, is contained in the additive composition or the R group thereof.

Most preferably in group —$C(R^1)_2$—, each $R^1$ independently is hydrogen or an alkyl group of from 1 to 4 carbon atoms, more preferably wherein one of $R^1$ is hydrogen and the other of $R^1$ is hydrogen, methyl or ethyl, most preferably the other of $R^1$ is hydrogen or methyl.

Generally, Y is a group 1 or 2 metal cation or a cation of the formula $[R^a_4M]^+$ as defined above. Suitable metals are lithium, sodium, potassium, rubidium, magnesium, calcium, strontium, and barium. Advantageously Y is a cation of a group 1 metal, such as lithium, sodium, potassium, or rubidium, most preferably a potassium cation. The potassium cation has been found to be especially suitable in the present invention because when reacted with halide containing residues present in polymer mixtures it gives a very stable and inert potassium halide salt, such as KCl. The alkali metal cations such as potassium and sodium are advantageously used in the preparation of the compositions of the present invention and thus afford an inexpensive and convenient route to the present additive compositions, as will be explained in more detail below. Alternatively, Y is an ammonium cation of the formula $[R^a_4N]^+$ wherein $R^a$ independently each occurrence is hydrogen or a hydrocarbyl group of from 1 to 25 carbon atoms, preferably an alkyl group of from 1 to 18 carbon atoms, more preferably of 1–10 carbon atoms.

In a preferred additive composition $0.0005 \leq n \leq 0.75$ and Y is a cation of a metal selected from group 1 of the Periodic Table of Elements. Advantageously, $0.005 \leq n \leq 0.5$ and Y is potassium. More preferably, $0.01 \leq n \leq 0.35$, most preferably, $0.02 \leq n \leq 0.30$.

It has been found advantageous in the use and processes according to the present invention that the additive composition contains at least 0.01 weight percent, preferably at least 0.02 weight percent, most preferably at least 0.05 weight percent of Y, based on the weight of the additive composition. The additive compound advantageously contains at most 15 weight percent, preferably at most 5 weight percent, most preferably at most 2.5 weight percent of Y, based on the weight of the additive composition.

The additive composition used in the present invention generally has a weight average molecular weight of at least 100, preferably of at least 200, suitably of at least 500, more suitably at least 1000. Although not critical, from an economical and efficiency point of view the weight averaged molecular weight is desirably not more than 25000, suitably not more than 10000, preferably not more than 5000, and most preferably not more than 2500. If the molecular weight is too high, the viscosity of the composition becomes too high. If the molecular weight is too low, the composition may be volatile and have a viscosity that is too low.

According to a preferred embodiment, the composition used in the present invention comprises a group A derived from the initiator compound which group A is bonded to, depending on the functionality of the initiator compound, one or more polyether or poly(thioether) groups, such as represented by the formula (—$(CHR^1)_t$—X—)$_v$, wherein t preferably is an integer from 2 to 4, especially 2, and $R^1$ each occurrence independently preferably is hydrogen, methyl or ethyl, and v is an integer from 1 to 250, preferably from 2 to 100, and each polyether or poly(thioether) group at its other end is bonded to an anionic group —$(CHR^1)_t$—$X^-$, or optionally a —$(CHR^1)_t$—X—H group, provided the composition has a relative mole fraction n of cations Y in the range from 0.005 to 0.5 and a relative mole fraction m of group —$C(R^1)_2$—X—H in the range from 0.5 to 0.995. Generally, in this preferred composition, the functionality of the initiator compound is from 1 to 20, preferably from 1 to 6, most preferably from 1 to 4. Preferably, this preferred composition has a Y content of from 0.02 to 5.0 weight %, wherein Y preferably is a potassium cation.

The methods for preparing the additive compositions used in the present invention are available to the person skilled in the art. Based on the desired composition or characteristics of the additive composition, the skilled person is able to prepare the compositions, where necessary using routine experimentation techniques. The current additive compositions are often intermediates in the production of several types of surfactants, such as polyglycols, prepared by using basic catalysts. In such preparation, typically an initiator compound, like an alcohol, carboxylic acid or other active hydrogen containing compound, is used which is reacted with one or more other compounds, like alkylene oxides or alkylene sulphides or cyclic ethers and cyclic thioethers. A catalyst, often a basic alkali metal catalyst, may be used, but is not always necessary. The catalyst typically reacts with the initiator compound to provide a reactive group, like an alkyloxide anion or an alkylsulphide anion, which is reactive with other compounds such as alkylene oxides. Also a monomer can be used as an initiator, typically after reaction with a catalyst. Using an initiator compound provides flexibility in making different additive compositions of different functionality and varying properties. When a basic catalyst is used, such as sodium or potassium hydroxide, in the reaction between initiator and monomers or comonomers, the initiator compound is initially converted into, for example, an alkoxide having, as a counter ion, the sodium or potassium cation. The reaction product is then reacted with a desired quantity of one or more monomers, either simultaneously or sequentially. Upon completion of the reaction with the monomers, the final composition still has alkoxide end groups with sodium or potassium cations Y. In the production of polyglycols or polyalkyleneoxy alcohols, at this stage the catalyst is neutralized and can be removed from the intermediate products and excess water that may be present can also be removed. In the production of the additive compositions according to the invention, at this stage only a purification step may be carried out to remove excess water, such as by flashing, but no catalyst neutralization or removal step is required. Illustrative examples of compounds that can be converted into the current additive compositions or whose intermediates can be easily converted into the additive compositions are given below. This affords a convenient and relatively inexpensive way of making the current compositions. Accordingly, it is preferred according to the present invention to obtain the composition by reacting an initiator compound having a reactive proton with an alkylene oxide in the presence of a basic catalyst comprising Y.

Alternatively, suitable surfactants can be converted into the additive compositions by reacting part or all of the hydroxyl or thiol groups with for example a compound Y', such as an alkali or alkaline earth metal or hydroxide thereof or a suitable ammonium hydroxide, thereby forming water as byproduct any excess of which is easily removed by conventional methods. It is preferred that the additive composition is obtained by reacting a composition having a weight averaged molecular weight of at least 100 and containing a group R and at least one group —C($R^1$)$_2$—X—H bonded to group R, with a compound Y' capable of forming a cation Y and an anionic group —C($R^1$)$_2$—X$^-$ bonded to group R, wherein R, C, $R^1$, X, Y, and H are as previously defined.

Suitable methods for preparing the current additive compositions or intermediates therefor are found in 1 "Nonionic Surfactants," in Surfactant Science Series (M. J. Schick ed., Marcel Dekker Inc. 1966) ("Schick") which is incorporated by reference herein.

Preferred classes of compounds from which the current additive compositions may be prepared or in whose preparations the current additive compositions are prepared as intermediates include polyoxyalkylene (alkyl or alkylaryl) alcohols, polyoxyalkylene (alkyl or alkylaryl) mercaptans, polyoxyalkylene (alkyl or alkylaryl) amines, alkoxylated polyglycerol fatty acids and esters, alkoxylated fatty acids, and polyoxyalkylene (alkyl or aryl) amides.

Exemplary polyoxyalkylene alcohols (Chapter 4 in Schick) include alkyl or alkenyl ethers of polyoxyethylene, polyoxypropylene, and polyoxybutylene or combinations thereof. Suitable initiator compounds for this class of products include alkyl alcohols, including primary and secondary, linear or branched alcohols, fatty alcohols, polyhydric alcohols, and water. Polyalkylene oxide block copolymers are described in Chapter 10 of Schick. Examples of polyoxyalkylene alkylaryl alcohols (Chapter 3 in Schick) include alkoxylated alkyl phenols, using for example nonyl phenol and tri-sec.-butylphenol as initiator compounds, ethylene oxide and strong bases such as NaOH and KOH as catalysts.

Exemplary of polyoxyalkylene mercaptans are the polyoxyalkylene alkyl or aryl mercaptans (Chapter 6 in Schick), using as initiator compounds normal aliphatic primary mercaptans, tertiary branched chain alkyl mercaptans, aromatic mercaptans and dry sodium methoxide, dry sodium or potassium hydroxide, aqueous sodium hydroxide, methanolic sodium hydroxide or sodium mercaptide as catalyst.

Exemplary of polyoxyalkylene (alkyl or aryl) amines (Chapter 7in Schick) are alkyl amine—EO/PO—block copolymers, coconut fatty amine alkoxylated with either EO/PO/BO, stearyl amine alkoxylated with either EO/PO/BO, lauryl propylene diamine alkoxylated with either EO/PO/BO. Typical initiator compounds include primary amines, such as coco amine, soybean amine, stearyl amine, tallow amine, secondary amines such as n-alkyl-1,3-propanediamines, and polyamines. Suitable catalysts that may be used include water and strong acids such as HCl.

Illustrative examples of alkoxylated polyglycerol fatty acids and esters and alkoxylated fatty acids (Chapter 5 in Schick) include diglycerol distearate alkoxylated with EO, PO or BO, oleic acid alkoxylated with EO, PO or BO. Initiator compounds are fatty acids and suitable catalysts include alkali metal carbonates and potassium carbonate.

Useful polyoxyalkylene alkylamides (Chapter 8 in Schick) include alkoxylated alkylol lauric monoamide, alkoxylated coconut diethanolamide, and alkoxylated stearyl amide. Suitable initiator compounds are mono and di-alkanol amides that are reacted with alkylene oxide in presence of a base catalyst. Other polyoxyalkylene alkylamides include those having sulfonamides, imides, carbamates, ureas, guanidines, imidazolines, and phosphonamidic acids. These are typically prepared from sulfonamide, acid amide, urea, acylguanylureas, guanylureas, guanidines (alkyl substituted), acyl carbamyl guanidine, or 2-imidazolines initiator compounds that are reacted with alkylene oxide in the presence of a base.

Olefin Polymerization Catalyst

The nature of the polymerization catalyst comprising a transition metal compound as used in the present invention is not critical, yet it should be capable of polymerizing olefin monomers. Such catalysts typically include a transition metal compound and a cocatalyst or activator. Typically, a transition metal compound and an organometallic compound are contained as the principal constituents. As the transition metal compound, there may be employed, for example, a halide of a transition metal of the groups 3 to the group 12 of Periodic Table of Elements (i.e. the groups from scandium through zinc), such as titanium halides, vanadium halides, vanadium oxyhalides and the like or an oxide of a transition metal of the groups 3–12, such as chromium trioxide, molybdenum trioxide and the like. Also mixed oxy halides, hydrocarbyloxides, mixed halides and hydrocarbyloxides are advantageously used. As the organometallic compound, there may be employed an organic aluminum compound such as alkyl aluminum, alkyl aluminum chloride, or an organic aluminum-magnesium complex such as alkyl aluminum-magnesium complex, and alkylalkoxy aluminum-magnesium complex. Suitable catalysts to be used in the present invention include the Ziegler-type catalysts and the Phillips-type catalysts.

Suitable polymerization catalysts that may be used in the present invention are disclosed in Japanese Laid-open Patent Publication No. 47409/1981 and No. 59806/1981, and U.S. Pat. Nos. 4,314,912, 4,547,475, 4,544,647, 4,526,943, and 4,661,465, which are incorporated herein by reference.

Exemplary of a preferred catalyst is a catalyst comprising a solid reaction product, obtained by the reaction between an organic magnesium compound and a titanium compound or a vanadium compound, and an organic aluminum compound, as disclosed in Japanese Laid-open Patent Publication No. 47409/1981 or No. 59806/1981.

A further example is a catalyst comprising a catalyst component [A] having a reaction product between an organic magnesium compound soluble in a hydrocarbon solvent, which may contain an electron donating organic compound, and one or a mixture of two or more selected from hydrogen chloride, organic halides, halides of boron, aluminum, silicon, germanium, tin, lead, phosphorus, arsenic, antimony, bismuth, zinc, cadmium and mercury, to be contacted with a titanium compound and/or a vanadium compound, and [B] an organometallic compound.

Another suitable catalyst composition is disclosed in U.S. Pat. No. 4,547,475 and U.S. Pat. No. 4,314,912 which are incorporated herein by reference. The catalyst composition comprises the product which results from combining (A) a magnesium halide prepared by contacting (1) at least one hydrocarbon soluble magnesium component represented by the general formula $R_2Mg.xAlR'_3$ and (2) at least one non-metallic or metallic halide source; (B) at least one transition metal compound represented by the formula $Tm(OR)_y X_{y-x}$ wherein Tm is a transition metal of Groups 4–12 of the Periodic Table; R is a hydrocarbyl group having from 1 to about 20 carbon atoms, X is a halide or hydrocarbyloxide, x and y each independently have values from zero up to the valence of Tm and x+y has a value equal to the valence of Tm; (C) optionally an additional halide source; (D) optionally an organoaluminum compound. Preferably, the amount of halide added is sufficient to convert the R groups attached to a magnesium atom in component (A) to a halide.

Further suitable catalyst compositions are disclosed in U.S. Pat. Nos. 4,544,647, 4,526,943, and 4,661,465 relating to the catalytic product resulting from admixing in an inert hydrocarbon diluent and in an atmosphere which excludes moisture and oxygen (A) at least one hydrocarbon soluble organomagnesium material; (B) at least one organic hydroxyl-containing material; (C) at least one reducing halide source; and (D) at least one transition metal (Tm) compound; and wherein (1) the components are added in the order (A), (B), (C) and (D) or (A), (B), (D) and (C).

Catalyst compositions containing a transition metal compound having at least one ligand having a cyclopentadienyl skeleton can also be used. These compounds also referred to as metallocenes or single site catalysts are advantageously used with a cocatalyst which may be an organoaluminum compound or organoboron compound, organoaluminum oxy compounds, such as aluminoxanes, ionic activator compounds comprising a labile bulky anion and a cation which is capable of reacting with a ligand of the transition metal metallocene to form an active catalyst. Examples of this last type activators are trisubstituted ammonium borates, such as anilinium tetrakis(pentafluorophenyl)borate. Such catalyst systems are suitably described in EP-416,815, EP-418,004, EP-277,003, EP-277,004, EP-EP-129,368, EP-250,601, which are incorporated by reference herein. The present invention is most advantageous if the catalyst composition used contains or reduces halides.

In the process of the present invention the catalyst preferably comprises halogen, more preferably the catalyst comprises a transition metal of groups 3–6 of the Periodic Table of Elements, a halide, an organoaluminum compound and optionally magnesium.

Olefin Polymerization Process

The olefin monomer used in the present invention is not critical. Preferred olefin monomers include ethylene and 1-olefins having from 3 to 20 carbon atoms, more preferably from 3 to 10 carbon atoms, as exemplified by propylene, butene-1, pentene-1, hexene-1, 4-methylpentene-1, heptene-1, octene-1, nonene-1, and decene-1, which can be used either alone or as a mixture. It is understood that alpha-olefins may be copolymerized with one or more other alpha-olefins and/or with small amounts i.e., up to about 25 weight percent based on the polymer of other polymerizable ethylenically unsaturated monomers such as styrene, alpha-methylstyrene and similar ethylenically unsaturated monomers which do not destroy conventional Ziegler catalysts. Most benefits are realized in the polymerization of aliphatic alpha-monoolefins, particularly ethylene, propylene and mixtures of ethylene or propylene and up to 50 weight percent, especially from about 0.1 to about 40 weight percent of another alpha-olefin such as propylene, butene-1, hexene-1, octene-1, 4-methyl-pentene-1, or an alpha/omega-diolefin such as 1,7-octadiene, based on total monomer.

The process of the present invention can be carried out in several different polymerization techniques. Suitable techniques include bulk polymerization, suspension polymerization, slurry polymerization, gas phase polymerization, solution polymerization, and high-pressure polymerization. Representative of such techniques is, for example, the solution polymerization method in which ethylene or propylene or a mixture of ethylene or propylene with a 1-olefin is polymerized in the presence of an inert hydrocarbon solvent at an average polymerization temperature above the softening point and preferably above the melting point of the resulting polymer, typically from 80° C. to 300° C., preferably from 100 to 300° C., most preferably from 130 to 275° C. The polymerization pressure typically is from 10 to 500 atm. Illustrative of the high temperature, high pressure polymerization method using a transition metal catalyst is one wherein ethylene or a mixture of ethylene with one or more 1-olefins is polymerized by feeding a transition metal polymerization catalyst at an average polymerization temperature of 130 to 300° C. under a polymerization pressure of 200 to 3,000 atm. Inert hydrocarbon diluents to be used in the solution or slurry polymerization techniques include butane, pentane, hexane, cyclohexane, heptane, octane, isooctane, nonane, decane, dodecane and mixtures thereof. Hydrogen or other chain transfer agents and polymerization temperature are typically used for controlling molecular weight of the olefin polymer.

In the process of the present invention also subsequent or parallel polymerization steps may be carried out in subsequent or parallel polymerization zones, each employing the same or a different type of catalyst. The additive composition can be used after every such polymerization step or at the end of two or more polymerization steps. U.S. Pat. No. 5,869,575 describes a polymerization processes for preparing polymer compositions of controlled composition and molecular weight distributions, wherein at least one homogeneous polymerization catalyst and at least one heterogeneous polymerization catalyst in separate reactors connected in series or in parallel is used. According to a preferred process ethylene and optionally another alpha-olefin is polymerized in a solution process under suitable solution polymerization temperatures and pressures in at least one reactor containing a homogeneous catalyst composition, and sequentially this polymer solution is passed into at least one other reactor containing a heterogeneous Ziegler catalyst, ethylene and optionally another alpha-olefin under solution polymerization conditions to form an additional polymer, and removing the solvent from the polymer solution and recovering the polymer composition. The homogeneous catalysts employed are desirably derived from metallocene compounds as aforementioned.

Further details for gas phase polymerization processes can be found in U.S. Pat. Nos. 4,588,790, 4,543,399, 5,352,749, 5,405,922, U.S. application Ser. No. 926,009, filed Aug. 5, 1992 (corresponding to WO-94/03509), and U.S. application Ser. No. 122,582, filed Sep. 17, 1993 (corresponding to WO-95/07942), which are incorporated herein by reference.

According to the present invention, the additive composition is added at the end of the polymerization zone or downstream from the polymerization zone. The reaction mixture emerging from the polymerization reactor or zone after completion of polymerization contains an olefin polymer, unaltered monomers, the polymerization catalyst a part of which may still be active and optionally an inert hydrocarbon diluent or solvent, when such a diluent or solvent is employed. In order to render the transition metal catalyst or its decomposition products inert after the polymer has been formed, the additive composition is mixed with the reaction mixture. Mixing may be practiced at a location which may be either before, at or after the outlet of the polymerization zone, typically formed by a reducing valve, if any, situated between the polymerization zone and the polymerization finishing steps, such as a polymer separator. As to the method for mixing, the polymer process stream and the additive composition stream may be simply mixed by combining the two streams into one stream. Alternatively, any other method may be available, so long as the catalyst components or its decomposition products can be rapidly contacted with the additive composition. It has been found advantageous to employ forced mixing means, such as a static mixer or an in-line mixer. The additive composition is preferably added before the polymer, and optional diluent, is subjected to separation steps to remove unreacted monomer or solvent. Such removal is typically done while increasing the temperature or decreasing the pressure, or both, to flash off the monomer and diluent. There can be one or two or more of such separation steps in sequence. In a solution polymerization process or in a high temperature high-pressure polymerization process, the polymer and additive composition remain within the molten polymer stream whereas the unreacted monomers, diluent and other gases are removed therefrom. In continuous processes, the removed unreacted monomers, any diluent and other gasses may be separated, where desired, and passed through recycle lines, optionally including purification steps, and may be fed back into the process again.

Depending on the characteristics, such as molecular weight, functionality, and Y content, the additive composition may be solid or liquid under normal conditions or under use conditions. The additive composition can be added as it is, i.e. as a pure solid or in molten state, or can be dissolved or suspended in an inert solvent or diluent. When an inert hydrocarbon solvent is used, it is preferred to be the same as the polymerization solvent, if any. If a solvent different from the polymerization solvent is to be employed, it should have no deleterious effect on recycled use of the polymerization solvent.

The additive composition is preferably added in a diluent or solvent such that its viscosity is similar to the viscosity of the polymer stream. This enables a quick and easy dispersion of the additive composition in the polymer, especially in processes wherein the polymer is molten or dissolved. It has been found that a very fine dispersion, substantially a molecular dispersion, can be obtained by using the current additive compositions. The solubility or dispersibility of the additive composition in a diluent can be adjusted by selecting appropriate compositions. Using a propylene-oxy containing additive composition enhances the compatibility of the additive composition with hydrocarbon diluents and hydrocarbon compounds, like olefin polymers. Using ethylene-oxy units enhances the compatibility with hydrophilic substances and increases reactivity or reaction rate of the additive composition with the transition metal catalyst or its decomposition products. It has been found very advantageous to use block copolymers obtained from propylene oxide, or butylene oxide, capped with ethylene oxide derived units. These types of additive compositions have been found to show good reactivity and dispersion in processes for making ethylene 1-olefin copolymer. Highly desirably, the additive compositions comprise at least 50 weight percent of propylene oxy or butylene oxy units, more preferably at least 60 weight percent, capped with less than 50 weight percent of ethylene oxide derived units, preferably less than 40 weight percent, yet preferably more than 1, suitably more than 2 weight percent. Depending on the later process steps and ultimate use conditions of the polymer, the additive composition preferably has a weight averaged molecular weight of at least 500 and more preferably of at least 1000. An additive composition with a too low molecular weight, depending on the prevalent temperature and pressure conditions, may be vaporized together with the solvent recovered or unaltered monomers in a polymer separator downstream of the polymerization zone. With a too high molecular weight, e.g. more than 25,000, the additive composition may be more difficult to disperse and depending on the functionality may not be economical in its use.

For gas phase and slurry polymerization processes it may be desirable to use lower viscosity additive compositions or suspensions or solutions as compared to solution polymerizations, because the additive composition needs to enter into the solid polymer particles that are formed in such a process. Accordingly, by varying the cation Y loading, the building blocks or monomers, initiator, functionality and molecular weight suitable additive compositions can be selected for specific polymer production processes.

It has been found that due to the very fine dispersion of the additive composition or its reaction products with the catalyst residues, the additive composition is less prone to give solid particles of any significant size in the polymer. The reaction products are also very finely, almost molecularly dispersed, which reduces gels in polymers and improves optical properties, such as clarity and haze. Furthermore, the absence of solid particles of any significant size on the surface of a film or article formed from such a polymer also enhances other properties like increased cling, where desired. Applications of the polymers where polymers are extended or stretched to a high degree also become within reach since the polymers obtained with the process or use of the current invention do not tear or break that easily in view of the lack of significantly sized solid particles in the current polymers. For example, during film stretching or fiber spinning, the dimensions of prior art additive solid particles approach those of the fiber or film thickness and form weaknesses in the stretched film or fiber which tend to break more easily. The polymer compositions obtained according to the present invention do not show these disadvantages, or to a lesser degree.

The reaction products of the additive composition and halide-containing catalyst components, residues, or decomposition products thereof, are believed, without wishing to be bound by any theory, to include the Y halide salt. Typical examples of this salt include KCl, NaCl, CaCl$_2$, and NR$^a{}_4$Cl. These salts are very well dispersed throughout the polymer, stable and basically inert. Other reaction products can include additive compositions complexed with catalyst components or derivatives thereof. A cation Y containing poly (alkylene-oxy) alcohol additive composition thus gives, upon reaction with the catalyst residues, the salt compound and the poly(alkylene-oxy) alcohol, both of which can remain in the polymer. It has been found that the resulting polymers have very low corrosivity properties and are essentially neutral, meaning that the acidic and corrosive catalyst residues are effectively rendered inert.

Accordingly, the present invention provides olefin polymers obtained according to the process or use of the present invention which polymers have improved optical properties whereas not causing corrosion and plate out problems.

Where the polymer is formed in a particle forming process such as a gas phase process or a slurry process which produces the polymer in solid particle form, the additive composition is preferably added prior to or during a melt extrusion step to allow the additive composition to mix intimately with the polymer and the catalyst residues. Typically, this is done when a solid polymer with fine particles, i.e. a powderous polymer, is being pelletized by melting the polymer powder and extruding it into strands, cutting the strands into pellets, and cooling the polymer pellets.

Alternatively, the additive composition can be added into a polymer to be converted into a molded article like a film, bottle, sheet or similar article when the polymer is subjected to heat and mixing or shearing forces to allow an intimate mixture of additive composition and polymer to be formed. Such conversion processes typically use melt extruders which can accomplish such intimate dispersion of the additive compositions with the polymer and thus contact with the catalyst residues.

Accordingly, the invention relates to the use of the present additive composition for rendering inert undesired quantities of acidic compounds or halogen-containing compounds present in an olefin polymer by mixing the olefin polymer intimately with the additive composition. Advantageously, the undesired quantities of acidic compounds or halogen-containing compounds are derived from a transition metal catalyst. Preferably, the olefin polymer, optionally in the presence of a diluent, is in a molten or dissolved state and the additive composition is contacted with said molten or dissolved polymer while the polymer and additive composition are being mixed.

The additive composition can also be used to stabilize or neutralize halogen-containing resins, such as polyvinyl chloride and halogenated polyethylene resins, or resins containing acidic residues such as copolymers of ethylene and unsaturated carboxylic acids, like acrylic acid.

The amount of the additive composition added should be sufficient to render a catalyst or undesired quantities of acidic compounds or halogen-containing compounds, preferably catalyst decomposition products, inert. In one preferred embodiment, it has been found that by using the additive compositions according to the present invention the catalyst can be rendered inert without releasing unacceptable levels of acidic or corrosive residues. Surprisingly, in another embodiment the present additive composition is capable of both deactivating a catalyst and capturing or rendering inert the decomposition products of such deactivation in one step. The mechanism of such activity is however not clarified.

The amount of the additive composition to be used in the present invention is not critical but from an economic and efficiency point of view is preferably from 500 to 4000 part per million by weight, based on the polymer weight, more preferably from 750 to 3000 parts per million, and most preferably from 900 to 2500 parts per million.

Advantageously the additive composition is allowed to contact the polymer stream before a separation step for at least a few seconds to several minutes, preferably from 10 seconds to 2 minutes, preferably under intimate mixing conditions.

Although not required, the additive composition can be used in combination with a compound capable of deactivating the catalyst. The process advantageously comprises the further step of adding at the end of or downstream from the polymerization zone a compound capable of deactivating the catalyst. The deactivator may be dissolved or suspended in an inert hydrocarbon solvent, or it may be used as a pure solid or under molten state. When an inert hydrocarbon solvent is used, it is preferred to be the same as the polymerization solvent, if any, or the solvent or diluent for the additive composition. Although not critical, the deactivator is preferably added prior to or upstream from, or simultaneously with the additive composition. The deactivator and additive composition can be added as one combined solution or suspension, or one being dissolved or suspended in the other.

Deactivator compounds that may be used in the process of the present invention include deactivators containing a reactive O, N, or S moiety, such as water, $CO_2$, $NH_3$, $SO_2$, $SO_3$, and $N_2O$, as well as relatively low and relatively high molecular weight alcohols, diols, triols, ethers, aldehydes, ketones, carboxylic acids and diacids, their anhydrides or esters, amines, amides or imides or hydrogen peroxide, alkyl hydroperoxides, and polyalkylene glycols such as polyethylene glycol. Further, reactive alkoxy silanes or siloxanes may be used such as tetraethoxysilane or silanol terminated siloxanes (silicon oils). Nitrogen components which may be used include for example high molecular weight amines, imides and amides such as oleoamide and erucamide and their reaction products with alcohols, carboxylic acids, or their anhydrides. Examples of sulfur compounds are thiols or polythiols. Preferably the deactivator is a compound having a reactive proton, such as water or an alcohol. Such deactivators can be suitably used in an admixture with the additive composition.

The resultant olefin polymer may be incorporated with conventional additives such as stabilizer, UV-absorber, antistatic agent, antiblocking agent, lubricant, pigment, inorganic or organic filler, a small amount of polymer such as rubber or others. Examples of these additives may include BHT; Ionox 330 (Shell Co.); Goodrite 3114 (Goodrich Co.); Irganox 1010, 1076, Irgafos 168, Tinuvin 327 (Ciba-Geigy Co.); Weston 618 (Borgwarner Co.); LS 770, LS 622 (Sankyo Co.).

The polymers as obtained according to the present invention are suitable for many types of applications, including those that require excellent optical properties, high stretch ratios, such as fiber spinning applications, injection molding, blow molding, rotomolding, and calendering.

The process of the present invention is described by referring to the following non-limiting Examples.

EXAMPLES

Relative averaged molecular weight of the additive composition is determined by gel permeation chromatography (GPC). 50 microliters of a sample solution (about 150 mg sample into 10 ml THF) is introduced onto the GPC column (filled with porous-particle column packing PL-Gel (5 μm); columns in series filled with PS/DVB of 50, 100, 500 and 1000 Å (30 cm each)). THF is used as eluent at a flow rate of 1 ml/min. The columnbox is maintained at a temperature of 35° C. A Waters DRI 410 differential refractometer is used as the detector.

Melt index of the olefin polymer is determined according to ASTM-D-1238 Procedure A, Condition E at 190° C./2.16 kg.

The content of potassium (Y) of the additive composition is calculated from KOH measurement by a standard acid-base titration method. The additive composition sample is dissolved in 2-propanol and titrated with hydrochloric acid to the desired equivalence point. The content of potassium is also measured by Flame photometry AOD-S method.

OH determination of the additive composition is measured by titration according ASTM D4274D method.

Corrosion Test

Aluminum cylindrical receptacles (7.5 cm high, 2.2 cm diameter) containing about 25 g of polymer are put in an oven at 225° C. provided with a nitrogen purge and the polymer is molten. Mild steel coupons of 5 cm by 1 cm (Nalco. Part number: P5071) pretreated by filing the surface, contacting them with hexane for 5 minutes, then with acetone for another 5 minutes, and drying, are inserted vertically in the aluminum receptacle into the molten polymer. Two reference coupons are subjected to the same procedure except that they are not contacted with molten polymer. After 24 hours the coupons are removed with pliers and the polymer is removed from the surface with a spatula. The surface of the coupons ($S_{exp}$) that has been in contact with the polymer sample is measured using a caliper gauge and the coupon is weighed ($W_0$) in an analytical balance ($10^{-4}$ g accuracy). The non-exposed reference coupons are also weighed ($W_{0nexp}$). The coupons are put inside the moisture chamber which is a glass tube containing water and provided with clamps for hanging the coupons above the water, at room temperature, for 24 hours thereby taking care that the coupons do not touch the walls. After 24 hours, the coupons and reference coupons are weighed again ($W_{24}$ and $W_{24nexp}$, respectively).

The weight gained by the coupon, after the polymer exposure, compared to the reference coupons is related to the corrosion and the corrosion index (CI) expressed in g/m² is calculated as follows:

$$CI = \frac{W_{24} - W_0}{S_{exp}} - CI_0\left(\frac{h_t - h_{exp}}{h_t}\right) = g/m^2$$

wherein: $CI_0$ is the corrosion index for the reference coupon calculated a follows:

$$CI_0 = \frac{W_{24n exp} - W_{0n exp}}{S} = g/m^2$$

$W_{24}$ is the weight (g) of the exposed coupon after 24 hours in moisture conditions;

$W_0$ is the weight (g) of the exposed coupon after 24 hours in contact with polymer after removing the polymer;

$S_{exp}$ is the surface area (m²) of the coupon in contact with the polymer;

$h_t$ is the total height (mm) of the coupon;

$h_{exp}$ is the height (mm) of the part of the coupon in contact with polymer;

$W_{24nexp}$ is the weight (g) of reference coupon after 24 hours in moisture conditions;

$W_{0nexp}$ is the weight (g) of reference coupon after 24 hours inside the oven; and S is the total surface area (m²) of the reference coupon.

The corrosion index is the mean of three separate measurements for each sample.

Example 1

750 gram of difunctional dipropylene glycol initiator and 430.6 gram KOH, 45% in water solution, are charged into a stainless steel 10 liter reactor, which is then flushed with nitrogen, heated up to 115° C., and the water flashed off at 30 mbar for 3 hours. After flashing, the initiator contained 0.77% water and 7.76% KOH. 9608 gram propylene oxide to a theoretical mole weight of 1850 gram/mole, was added in 5.5 hours at 125° C., 3–4 bar, and digested for 3 hour at 125° C. 724 gram ethylene oxide to a theoretical mole weight of 1990 gram/mole, equal to 7% EO in the end product, was added in 0.5 hours at 125° C., 2–3 bar, and maintained for 5 hours at 125° C. After cooling down to 40° C., the content of the reactor was discharged into a carbon steel container under nitrogen atmosphere. The characteristics of this additive composition AC1 are shown in Table 1.

Other additive compositions were prepared according to essentially the same procedure thereby altering the amounts of reactants to provide the compositions with the characteristics as incorporated in Table 1.

TABLE 1

| Add. Comp. | $M_w$ (theor.) | EO (wt. %) | K content (wt. %) | n (mole fraction Y) |
|---|---|---|---|---|
| AC1 | 1550 | 7 | 1.18 | 0.233 |
| AC2 | 1540 | 7 | 0.22 | 0.044 |
| AC3 | 2195 | 11 | 0.17 | 0.047 |
| AC4 | 1120 | 11 | 0.17 | 0.025 |
| AC5 | 2100 | 7 | 0.17 | 0.047 |
| AC6 | 2400 | 19 | 0.15 | 0.047 |
| AC7 | 1120 | 11 | 1.62 | 0.233 |
| AC8 | 2100 | 7 | 0.90 | 0.241 |

Example 2

Ethylene-1-octene polymerization runs are carried out in two continuous stirred tank reactors (CSTR's) of 5 liters each in volume, which are agitated and operated in series. The reactors are equipped with a shell to keep the reactor volume at adiabatic conditions. The feed to the first reactor comprises an $C_{8-10}$ n-alkane mixture solvent with a boiling range of 100° C. to 140° C. at 30 kg/hr, and ethylene corresponding to 20 weight percent of the total solvent stream, compressed and dissolved in the solvent stream prior to reactor entry. The temperature of the solvent/ethylene feed is 15° C. at a pressure of 35 bar. 1-Octene is added as a separate stream into the first reactor. By an additional separate stream fresh solvent, a Ziegler type catalyst suspension in the same n-alkane mixture is injected into the first reactor at a rate of about 0.01 g Ti/hr. The catalyst is prepared essentially according to the procedure of U.S. Pat. No. 4,547,475 and contains Mg/Cl/Al/Ti in the mole ratios 13/35/4/1. Together with the catalyst, triethylaluminum is fed in an amount of 3.5 mole of Al per mole of Ti. During the subsequent polymerization of the ethylene/octene mixture 82% of the ethylene is converted and the reactor temperature increases to 180° C. The molten dissolved polymer enters into the second reactor where another 8–9% ethylene is converted, increasing the reaction temperature up to 200° C. at a pressure of 35 bar. About 5.2 kg polymer per hour is so formed having a melt index of 3 and a density of 0.914 g/cm$^3$ and containing about 12 weight percent of octene.

After the product stream containing polymer, monomer, solvent and catalyst leaves the second reactor, 20 parts per million by weight (ppm) of water, based on polymer loading, are injected prior to a static mixer to allow for quick and effective mixing. The water is dosed as a 1000 ppm water solution in the previously described solvent at 40 bar and 150° C. After allowing the water to react with the catalyst for 10 seconds, a quantity, as mentioned in the table below, of additive composition is added, expressed in weight ppm based on polymer loading, wherein the additive composition is added as a 10 weight percent solution in the same solvent. The comparative experiment using calcium stearate containing 2–3 percent water is carried out in the same way except that no separate water is added, thereby using a calcium stearate suspension of 9 weight percent in the same solvent. Subsequently, other additives, among which primary and secondary antioxidants are dosed into the polymer stream separately from a slurry tank, typically 500 ppm of primary anti-oxidant and 1200 ppm of secondary antioxidant.

The polymer stream comprising polymer, solvent, ethylene, 1-octene, catalyst and additive composition or their residues, and antioxidants is devolatilized in a series of two flash vessels. Prior to entering the first vessel the mixture is heated to 250° C. at 35 bar. In the first flash vessel the pressure is reduced to 1.5 bar and the temperature drops to 200° C. These steps result in evaporation of 98% of the total solvent/octene and substantially all of the ethylene, giving a polymer melt stream with 8% by weight dissolved solvent. The residues of the catalyst and additive composition will remain in the polymer. The polymer stream is again heated to 250° C. and entered into the second flash vessel where a vacuum of 20 mbar is applied to remove the last portion of solvent, yielding a polymer with 1000 ppm residual solvent. The catalyst and additive residues remain in the polymer stream. The molten polymer stream then passes through a melt forming die and cutter, and is cooled to give solid pellets. A total of about 25 kg polymer was produced in each run. The specific conditions used in the separate runs are included in the Table 2. The polymer products thus produced were subjected to the corrosion test to determine the corrosion index, which is also included in Table 2.

TABLE 2

| Run # | Additive | Add. Amount (ppm) | K added (ppm) | Corrosion Index (g/m$^2$) |
|---|---|---|---|---|
| 1 | calcium stearate | 1800 | — | 0.21 |
| 2 | AC3 | 2000 | 3.4 | 0.23 |
| 3 | AC4 | 960 | 1.6 | 0.19 |
| 4 | AC5 | 2000 | 3.4 | 0.12 |
| 5 | AC6 | 2000 | 3.0 | 0.21 |
| 6 | AC8 | 2000 | 18.0 | 0.10 |
| 7 | AC7 | 960 | 15.6 | 0.29 |

The corrosion index of the polymers obtained with the additive compositions according to the present invention is about the same or better than for the state of the art calcium stearate scavenger. However, when using the current additive compositions, no acidic residues are released from the polymer upon processing, plate out of fatty acids on processing equipment is avoided, and the additive compositions are much better divided throughout the polymer in very fine, almost molecular dispersion. No fouling of recycle lines or other post reactor equipment has been observed for the process of the present invention.

Example 3

The following general procedure is used to determine the effect of the additive composition in deactivating a 1-octene polymerization reaction. A 20-ml Chrompack vial is filled with a total of 10 ml 1-octene. A thermocouple is inserted in the vial. 0.13 ml of a catalyst suspension in n-heptane having a concentration of 0.624 g Ti/l is added to the vial, directly followed by 0.92 ml of a 0.055-M triethylaluminum solution in heptane. The catalyst used in this experiment is the same as the catalyst used in Example 2. The temperature is measured from addition of the catalyst components until 60 min thereafter. One run is carried out as a comparative run, without adding the additive composition, whereas in the other runs 1.1 ml of a 10 weight percent solution of additive composition in $C_{8-10}$ alkane mixture is added (corresponding to 0.08 g of additive composition AC1) is added at different time intervals. The time of adding the additive composition and the measured maximum temperatures, due to the reaction exotherm, are included in Table 3. It is observed that after the reaction is finished the temperature decreases gradually because of loss of heat to the surroundings. Another comparative run is carried out using a polyglycol (PG) prepared by neutralizing additive composition AC1 with water and using magnesium silicate to remove the potassium.

Upon termination of some of the runs, the contents are mixed with 3 ml of water for 10 min. The water is decanted and the pH of the decanted water is determined. The results are included in Table 3.

TABLE 3

| Run # | Additive | Time added (min) | Start Temp. (° C.) | Maximum Temp. (° C.) | pH |
|---|---|---|---|---|---|
| 1(C) | none | — | 15 | 80 | nd |
| 2 | AC1 | 3 | 12 | 17 | nd |
| 3 | AC1 | 0 | 14 | 14 | 6.0 |
| 4(C) | PG | 0 | 15 | 15 | 2.5 |

(C) is Comparative experiment
nd is not determined

These experiments show that the additive composition can terminate an ongoing olefin polymerization reaction as well as prevent the start of such a reaction. In addition, the additive compositions used in the present invention do not release acidic residues as evidenced by the hydrolyzation, different from the comparative run using a polyglycol (without potassium). The present additive compositions therefore not only are capable of inactivating a polymerization catalyst but also prevent the release of acidic residues or render the same inert. The prior art deactivators do not perform all these functions at the same time and require an additional acid or halogen scavenger.

Example 4

Polymer samples prepared according to the procedures in Example 2 are tested for their HCl release characteristics.

Ethylene/1-octene copolymer samples of density 920 kg/m³ and melt index of 1 g/10 min are prepared containing the additives as mentioned in Table 4.

100 grams of these samples were heated at 200° C. for 24 hours in a beaker in air. On top of the beaker was provided a permeable cellulose screen on top of which was a weighted amount of about 5 grams of bromothymol blue HCl indicator material. The vapors released from the heated polymer samples passed the screen and the color of the indicator material was observed as well as its chloride content was determined. This was done by desorbing the chloride scavenged by the bromophenol blue with 10 ml of de-mineralized water. The solutions were analyzed by anion chromatography with an AS-11 HC column and EG-40. Quantification with external standards was done in de-mineralized water. As a control, the same procedure was carried out on a blank without any polymer sample.

TABLE 4

| Additive | Amount [ppm] | Color | [Cl⁻] [mg Cl/ kg indicator] |
|---|---|---|---|
| PE without additive | — | light green | 8.84 |
| Calcium stearate | 1200 | light blue | 1.92 |
| AC1 | 3400 | white | 1.95 |
| Control - no PE | — | dark blue | 0.12 |

These results show that a polyethylene produced using the additive composition according to the present invention does not release more HCl than the comparative calcium stearate containing polyethylene.

What is claimed is:

1. A process for producing olefin polymers, which comprises the steps of:
   (a) polymerizing an olefin monomer in a polymerization zone in the presence of a catalyst comprising a transition metal compound to form an olefin polymer, and
   (b) adding to and mixing with the olefin polymer at the end of or downstream from the polymerization zone an additive composition comprising a compound having a weight averaged molecular weight of at least 100 and containing a group R, a cation Y, an anionic group $-C(R^1)_2-X^-$ bonded to group R, and optionally a group $-C(R^1)_2-X-H$ bonded to group R, wherein
   $R^1$ each occurrence independently represents hydrogen or an alkyl group having from 1 to 20 carbon atoms,
   X is an element selected from group 16 of the periodic table of elements,
   R comprises one or more units of the general formula $(-(CHR^1)_t-X-)$, wherein $R^1$ is as previously defined and $-X-$ is an ether or thioether linkage between two carbon atoms, and t is an integer from 1 to 10, which units may be the same or different,
   Y is selected from the group consisting of cations of metals selected from groups 1 and 2 of the Periodic Table of Elements and cations of the formula $[R^a{}_4M]^+$, wherein M is an element of group 15 of the Periodic Table of Elements, and $R^a$ independently each occurrence is hydrogen or a hydrocarbyl group,
   C is carbon, and
   H is hydrogen,
   the additive composition having a relative mole fraction, n, of cations Y and a relative mole fraction, m, of groups of the formula $-C(R^1)_2-X-H$, wherein $0<n1$, $0 \leq m<1$, and $n+m=1$.

2. The process of claim 1 wherein $(-(CHR^1)_t-X-)$ is derived from ethylene oxide, propylene oxide, butylene oxide, or mixtures thereof.

3. The process according to claim 2 wherein in the units $(-(CHR^1)_t-X-)$ of the additive composition, t is 2, one $R^1$ is hydrogen and the other $R^1$ is hydrogen, methyl or ethyl, and X is oxygen.

4. The process of claim 2 wherein the additive composition employed in step (b) has a weight averaged molecular weight from 1000 to 2500.

5. The process of claim 1 wherein the additive composition comprises a compound selected from the group consisting of: $H-X-C(R^1)_2-R-C(R^1)_2-X^-Y$, $[H-X-C(R^1)_2-R-C(R^1)_2-X^-]_2Y$, and $HR-C(R^1)_2-X^-Y$, wherein X, $R^1$, R and Y are as defined in claim 1.

6. The process of claim 5 wherein the additive composition consists essentially of a compound selected from the group consisting of: $H-X-C(R^1)_2-R-C(R^1)_2-X^-Y$, $[H-X-C(R^1)_2-R-C(R^1)_2-X^{31}]_2Y$, and $HR-C(R^1)_2-X^-Y$, wherein X, $R^1$, R and Y are as defined in claim 5.

7. The process of claim 2 wherein the additive composition comprises a compound having at least 50 weight percent propylene oxy- or butylene oxy units capped with less than 50 weight percent of ethylene oxide derived units.

8. The process of claim 1 wherein the additive composition comprises a compound having a weight averaged molecular weight of at least 500.

9. The process of claim 1 wherein the additive composition is added to a polymer stream exiting a polymerization reactor and prior to separation of the polymer from unreacted monomer or solvent.

10. The process of claim 1 wherein the additive composition is added to an olefin polymer stream in the form of a pure solid, in molten state, or dissolved or suspended in an inert hydrocarbon solvent.

11. An olefin polymer obtained by the process of any one of claims 1-4 and 5-10.

* * * * *